United States Patent
Shi et al.

(10) Patent No.: US 11,954,806 B1
(45) Date of Patent: Apr. 9, 2024

(54) POLAR NAVIGATION WINDOW PERIOD ASSESSMENT SYSTEM BASED ON THREE-DIMENSIONAL VISUALIZATION SIMULATION OF SHIP-ICE INTERACTION

(71) Applicant: SHANGHAI JIAO TONG UNIVERSITY, Shanghai (CN)

(72) Inventors: Guijie Shi, Shanghai (CN); Deyu Wang, Shanghai (CN); Wenjun Luo, Shanghai (CN); Chuntong Li, Shanghai (CN); Jiaqi Jiang, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 18/501,998

(22) Filed: Nov. 4, 2023

(30) Foreign Application Priority Data

Feb. 24, 2023 (CN) .......................... 202310162955.6

(51) Int. Cl.
  *G06T 19/00* (2011.01)
  *G06F 3/01* (2006.01)

(52) U.S. Cl.
  CPC ............ *G06T 19/003* (2013.01); *G06F 3/011* (2013.01)

(58) Field of Classification Search
  CPC ................................ G06T 19/003; G06F 3/011
  See application file for complete search history.

(56) References Cited

U.S. PATENT DOCUMENTS

2020/0208979 A1 * 7/2020 Pandey ................ G01C 21/005

FOREIGN PATENT DOCUMENTS

| CN | 102663921 A | 9/2012 |
|---|---|---|
| CN | 103631148 A | 3/2014 |

(Continued)

OTHER PUBLICATIONS

L. Jingxian, X. Haixiang and D. Jian, "Research of Ship Navigation Virtual Reality System and its Application," 2009 First International Workshop on Education Technology and Computer Science, Wuhan, China, 2009, pp. 382-386, doi: 10.1109/ETCS.2009.613. (Year: 2009).*

(Continued)

*Primary Examiner* — Yu Chen
(74) *Attorney, Agent, or Firm* — Sean A. Passino; Rachel K. Pilloff; Pilloff Passino & Cosenza LLP

(57) ABSTRACT

A polar navigation window period assessment system based on three-dimensional visualization simulation of ship-ice interaction is provided in the present application, including a virtual reality interactive operation module for interacting with virtual reality scenes based on a virtual reality (VR) handle and a VR helmet; a three-dimensional virtual visualization integration module for observing the virtual reality scenes from a global perspective; a three-dimensional simulation module of the Arctic route environment for simulating a route environment scene; an Arctic navigation virtual scene module for establishing a navigation virtual scene; an Arctic navigation window period assessment module for assessing navigation window periods of the ship on different routes; a system storing and outputting module for storing interactive operation information, virtual reality scene information and window period assessment result information, and outputting them in form of curve diagrams and data tables.

6 Claims, 8 Drawing Sheets

(56) References Cited

FOREIGN PATENT DOCUMENTS

| CN | 105159954 | A |   | 12/2015 |
|----|-----------|---|---|---------|
| CN | 106327610 | A |   | 1/2017  |
| CN | 107065597 | A |   | 8/2017  |
| CN | 110440804 | A | * | 11/2019 |
| CN | 110440804 | A |   | 11/2019 |
| CN | 115017246 | A |   | 9/2022  |
| CN | 115877843 | A | * | 3/2023  |
| KR | 20160139648 | A |   | 12/2016 |

OTHER PUBLICATIONS

W. Mao, J. Han, D. Zhang, C. Zhang, D. Wu and W. Cao, "Review of ship navigation safety in ice-covered waters," 2021 6th International Conference on Transportation Information and Safety (ICTIS), Wuhan, China, 2021, pp. 613-621, doi: 10.1109/ICTIS54573.2021.9798660. (Year: 2021).*

D. Zhang, J. Han, D. Wu and W. Mao, "The Model of Ship Navigation Risk Field for Risk Assessment of Icebreaker Convoy Operations," in IEEE Transactions on Intelligent Transportation Systems, doi: 10.1109/TITS.2023.3311016. (Year: 2023).*

Notice of the First Office Action for China Application No. 202310162955.6, dated Jul. 16, 2023.

First Search Report for China Application No. 202310162955.6, dated Jul. 15, 2023.

Supplementary Search Report for China Application No. 202310162955.6, dated Jul. 27, 2023.

Notification to Grant Patent Right for China Application No. 202310162955.6, dated Jul. 31, 2023.

* cited by examiner

POLAR NAVIGATION WINDOW PERIOD ASSESSMENT SYSTEM BASED ON THREE-DIMENSIONAL VISUALIZATION SIMULATION OF SHIP-ICE INTERACTION

CROSS-REFERENCE TO RELATED APPLICATIONS

This application claims priority of Chinese Patent Application No. 202310162955.6, filed on Feb. 24, 2023, the entire contents of which are incorporated herein by reference.

TECHNICAL FIELD

The present application belongs to the technical field of ship navigation safety management system, and in particular relates to a polar navigation window period assessment system based on three-dimensional visualization simulation of ship-ice interaction.

BACKGROUND

With the accelerated melting of Arctic summer sea ice, seasonal navigation on the Arctic Northeast route has gradually become a reality. Although the summer sea ice on the Arctic Northeast route generally shows a decreasing trend, the ice conditions change greatly every year, throwing great safety threats to ships navigating on the Arctic Northeast route and making it difficult to accurately judge window periods for navigations. In addition, merchant ships navigating on the Arctic Northeast route are mainly low-ice class or ice-free area reinforced ships with relatively weak ice-resistance, and may have severe accidents if being trapped or damaged by ice.

The assessment of the Arctic navigation window period is a key link in selecting the Arctic routes, as a variety of factors, such as changes in ice conditions, ship ice-resistance and ship performance under sea ice, are taken into account. However, at present, there is a lack of intuitive, immersive and effective auxiliary decision-making system support, and China has accumulated relatively little experience in Arctic navigations. Under the complex sea ice environment in the Arctic, improper assessment of the Arctic navigation window period will bring negative consequences to the economic benefits of shipping and maritime safety.

The principle of the assessment of the Arctic navigation window period is to grasp the current situation and the changing trend of the ice conditions in the navigation route area, and with the help of the risk analysis method for the safety of ship navigation under sea ice, assess the navigation speed, choice of routes, ship types and other factors, and consider the possible ice-breaking pilotage and independent navigation scenarios to get the earliest time for a ship to enter the Arctic Northeast route and the latest time for the ship to leave the Arctic Northeast route, and then to form a mathematical expression of the window period (e.g., a number of days) for the Arctic Northeast route navigation.

The existing assessment of the Arctic navigation window period has following problems: (1) it tends to establish complex theoretical analysis models, but it is difficult to grasp the effective correlation between the analysis models and the actual ice conditions; (2) the mechanical response analysis of ships under sea ice and the assessment of the Arctic navigation window period are separate, ignoring the significant differences in mechanical response of ships under different sea-ice interactions; (3) the assessment of the Arctic navigation window period lacks three-dimensional scene simulation of ship-ice interaction process, and lacks immersive and realistic experience; (4) by using conventional simulation software, the effect of ship-ice interaction on local areas can be obtained, but this method is time-consuming and labor-intensive, making it difficult to expand to rapid simulation of ship-ice on a large scale.

Therefore, there is an urgent need to propose a polar navigation window period assessment system based on three-dimensional visualization simulation of ship-ice interaction.

SUMMARY

The purpose of the present application is to provide a polar navigation window period assessment system based on three-dimensional visualization simulation of ship-ice interaction, in order to solve the aforementioned problems of the prior art.

To achieve the above purpose, the present application provides a polar navigation window period assessment system based on three-dimensional visualization simulation of ship-ice interaction, including a virtual reality interactive operation module, a three-dimensional virtual visualization integration module, a three-dimensional simulation module of an Arctic route environment, an Arctic navigation virtual scene module, an Arctic navigation window period assessment module and a system storing and outputting module connected in sequence;

the virtual reality interactive operation module is used for interacting with virtual reality scenes based on a virtual reality (VR) handle and a VR helmet, and the virtual reality scenes include an internal view of a hull, a route environment scene and a navigation virtual scene;

the three-dimensional virtual visualization integration module is used for observing the virtual reality scenes using a global perspective;

the three-dimensional simulation module of the Arctic route environment is used for setting a route layer, a sea ice layer, a wave layer, a wind field layer and a dense fog layer to simulate the route environment scene;

the Arctic navigation virtual scene module is used for establishing the navigation virtual scene of a sea ice breaking process, a ship-ice collision interaction, ship resistance and structural response under sea ice, and six-degree-of-freedom motion of the hull under sea ice;

the Arctic navigation window period assessment module is used for assessing navigation window periods of a ship on different routes based on sea ice distribution information and sea ice forecasting information;

the system storing and outputting module is used for storing interactive operation information, virtual reality scene information and window period assessment result information, and outputting them in form of curve diagrams and data tables.

Optionally, the polar navigation window period assessment system further includes a database module, and the database module is used for establishing a navigation route database based on Arctic geographic information; establishing a sea ice database, a wave database and a wind field database based on airborne remote sensing, on-board monitoring and sea/land monitoring measures; establishing a ship type database based on ship design information; and establishing a database of ship performance and structural response changes under different sea-ice interactions based on ship performance and safety analysis.

Optionally, the virtual reality interactive operation module is used for changing time nodes and spatial positions of the ship in the Arctic routes through the VR handle, realizing a real-time dynamic adjustment of a navigation scene, and displaying the navigation virtual scene of the polar ship through the VR helmet; and the navigation virtual scene includes a three-dimensional global view, a port-side ship-ice view, a starboard-side ship-ice view, a bow-side ship-ice view, an internal view of the hull, a threshold exceeded alarm and a navigation window period.

Optionally, the three-dimensional simulation module of the Arctic route environment is used for setting up the route layer, the sea ice layer, the wave layer, the wind field layer and the dense fog layer to simulate the route environment scene by retrieving the corresponding data in the database module, and obtaining sea ice shape information, sea ice distribution information, sea ice density information, and ice thickness information, and establishing a three-dimensional distribution scene of sea ice.

Optionally, the route layer is used for establishing a navigation route bathymetric distribution map according to a latitude and longitude range of the Arctic Northeast route; the sea ice layer is used for simulating environmental changes of waves, sea ice, wind field and dense fog according to changes in time and space; the wave layer is used for simulating fluctuating effects by combining wave heights, wave periods and different waves; the wind field layer is used for making flags on the ship flutter with wind by indicating information of wind speeds and wind directions; the dense fog layer is used for increasing dense fog and obtaining an effective sight distance of personnel on the ship through visibility indexes.

Optionally, the Arctic navigation virtual scene module is used for retrieving corresponding data in the database module, and obtaining a sea-ice collision load based on a contact point between a hull shell and sea ice and in conjunction with a relative speed of a ship to ice, generating a sea ice breaking shape based on the sea-ice collision load and ice strength indexes, and generating a plurality of pieces of broken ice randomly through circumferential cracking and radial cracking, and thus establishing the sea ice breaking process; establishing the ship-ice collision interaction based on physical properties of sea ice; analyzing ship resistance and structural response under sea ice based on a ship simulation model; assessing motion response of the ship in ice-water mixtures, and establishing the navigation virtual scene of the six-degree-of-freedom motion of the hull under sea ice based on a wave load, a sea ice load, and a ship weight load.

Optionally, the Arctic navigation window period assessment module is used for planning navigation routes of the ship and parsing automatic identification system (AIS) data of the ship to obtain a longitude, a latitude, a speed, a heading, a type, MMSI (Maritime Mobile Service Identity), an ice class and propulsion power of the ship; assessing a comprehensive navigation risk in an ice area based on sea ice density, sea ice thickness, ship ice-resistance and ship propulsion power; and assessing the navigation window periods of the ship on different routes based on sea ice distribution and sea ice forecasting information, and making intelligent judgment on the navigation window periods based on machine learning.

The technical effects of the present application are:

The application effectively integrates the sea ice remote sensing information and measured data to improve the accuracy of sea ice identification; the use of machine learning methods and historical data to realize the short-term forecasting of sea ice changes, providing data for the safe navigation of ships in the polar region; the simulation process of sea ice morphology and ship-ice interaction process is shown, which realistically presents the three-dimensional effect of the sea ice fragmentation under collision interaction; the assessment module of the polar navigation window period enhances the intelligent judgment of the Arctic routes passage; and the setup of the virtual reality scenes facilitates the user to experience the navigation process of the polar ice area in an immersive way.

The assessment system of the present application has a simple working principle, easy equipment arrangement, real and effective scenes, and diverse application scenes, which facilitates polar navigation safety assessment and simulation training, and solves the problem of a lack of a virtual reality platform for polar navigation safety analysis.

BRIEF DESCRIPTION OF THE DRAWINGS

The accompanying drawings, which form part of this application, are used for providing a further understanding of this application, and the schematic embodiments of this application and their illustrations are used for explaining this application and do not constitute an undue limitation of this application. In the accompanying drawings.

DETAILED DESCRIPTION OF THE EMBODIMENTS

It is to be noted that the embodiments and the features in the embodiments in the present application may be combined with each other without conflict. The present application will be described in detail below with reference to the accompanying drawings and in connection with the embodiments.

It is noted that the steps illustrated in the flowchart of the accompanying drawings may be performed in a computer system such as a set of computer-executable instructions, and that, although a logical order is illustrated in the flowchart, in some instances, the steps illustrated or described may be performed in a different order than herein.

Embodiment 1

Figure 1:
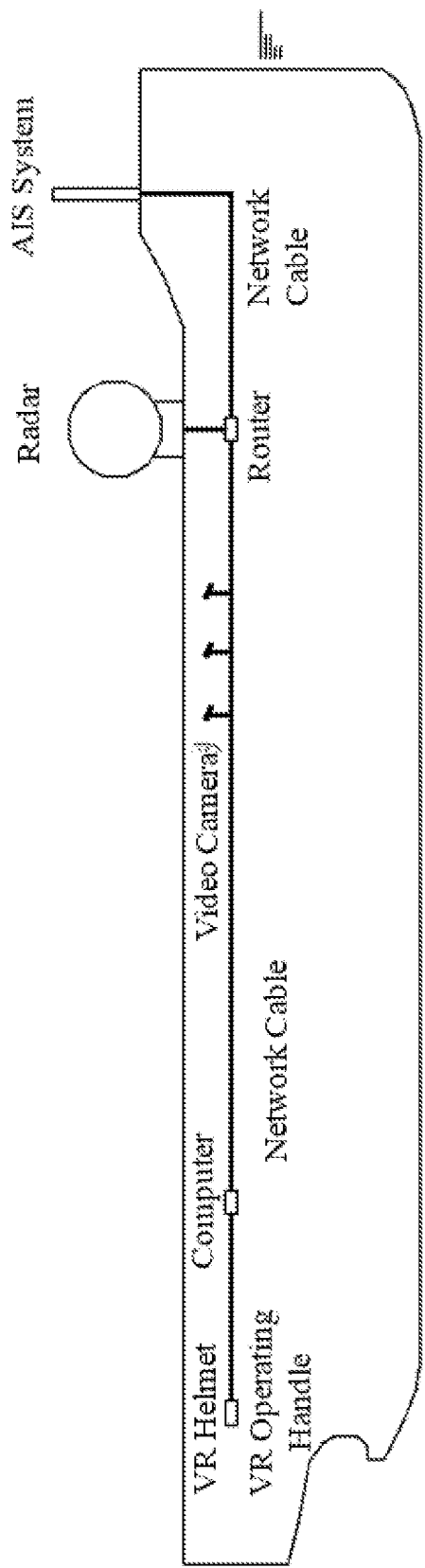
FIG. 1 shows a schematic diagram of on-board hardware devices in an embodiment of the present application.

As shown in FIG. 1, a polar navigation window period assessment system based on three-dimensional visualization simulation of ship-ice interaction is provided in this embodiment, and a platform of the system includes hardware devices such as a ship automatic identification system (AIS) system, a computer, a monitor, a virtual reality (VR) helmet, a VR operating handle, video cameras, a radar, a network cable, a router, a power supply and other hardware devices, and it further includes a ship type database, a navigation route database, a sea ice database, a sea ice identification program, a sea ice simulation program, a sea ice forecasting program, a ship-ice interaction simulation program, a navigation window period assessment program, a three-dimensional visualization integration program and other software platforms.

Ship AIS data provide information such as a navigation longitude, a latitude, a speed, a heading, a type, a shipyard, a ship breadth and MMSI of the ship, etc.; the computer and the display are placed in a laboratory or on a ship, and information of sea ice remote sensing products is collected through a network to obtain a distribution of sea ice in a wide range along Arctic routes; and information captured by the video cameras and information from the radar monitoring is received through the network cable and the router to obtain real-time information of the sea ice in navigation areas around the ship. The information of ship type, navigation route and sea ice is categorized and stored in the computer in form of a database, which is convenient for a quick inquiry, a reading and transmission of data. Through development of the sea ice identification program, geometrical information of a sea ice density and a sea ice thickness in navigation areas of a ship is identified by geometrical large-scale sea ice remote sensing data, pictures taken around the ship and radar monitoring data; through development of the sea ice simulation program, a digital method is used for simulating a shape, a distribution and a thickness of sea ice, and difference between the simulation and the actual sea ice is assessed by realism indexes; through the sea ice forecasting program, which combines historical data with in situ observations, machine learning is used for forecasting sea ice changes over the next few days or weeks; through development of the ship-ice interaction simulation program, a ship-ice collision, a sea ice overturning, a ship-ice interaction load, and hull structural response etc. are simulated; through development of the navigation window period assessment program, a risk level of navigability of the ship under specific sea ice scenes is assessed by the curves of navigation safety speed and sea ice density with safe navigation thresholds; the databases, program modules and visualization platforms are integrated by the three-dimensional visualization integration program, then a VR helmet and a VR operating handle can be used to achieve immersive interactive virtual operations and assessments of polar navigation scenes.

The main purpose of the hardware devices arrangement on board, as shown in FIG. 1, is to obtain information about an actual navigational environment in a vicinity of a ship. Through an automatic identification system (AIS) of the ship, the physical position of the ship, navigation status, ship attributes and other information are determined. Sea ice images of the sea area around the ship are captured by video cameras to provide data for a sea ice identification. Information of large chunks of dangerous sea ice around the ship, including sea ice speeds, iceberg/ridge contours, etc. is monitored through a radar (if configured). Ship monitoring information is connected to a network through a router and transmitted to a control computer system of the ship. The ship is equipped with a VR helmet and a VR handle for the experience of virtual scenes in this system.

Figure 2:
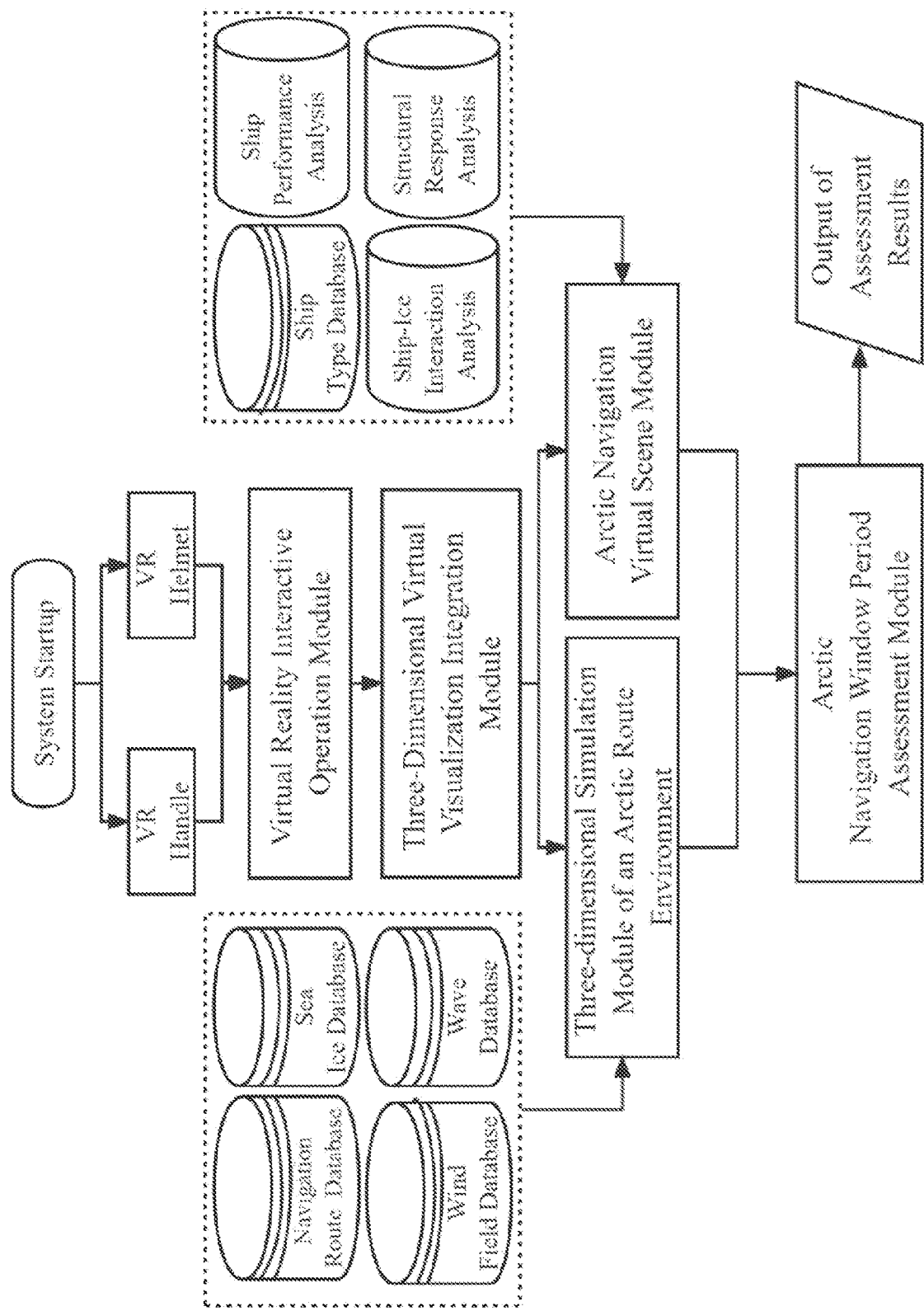
FIG. 2 shows a diagram of an architecture of a polar navigation window period assessment system based on three-dimensional visualization simulation of ship-ice interaction in the embodiment of the present application.

An architecture of the polar navigation window period assessment system based on three-dimensional visualization simulation of ship-ice interaction, as shown in FIG. 2, includes a virtual reality interactive operation module, a three-dimensional simulation module of an Arctic route environment, an Arctic navigation virtual scene module, an Arctic navigation window period assessment module, a three-dimensional virtual visualization integration module, a system storing and outputting module etc.

Figure 3:
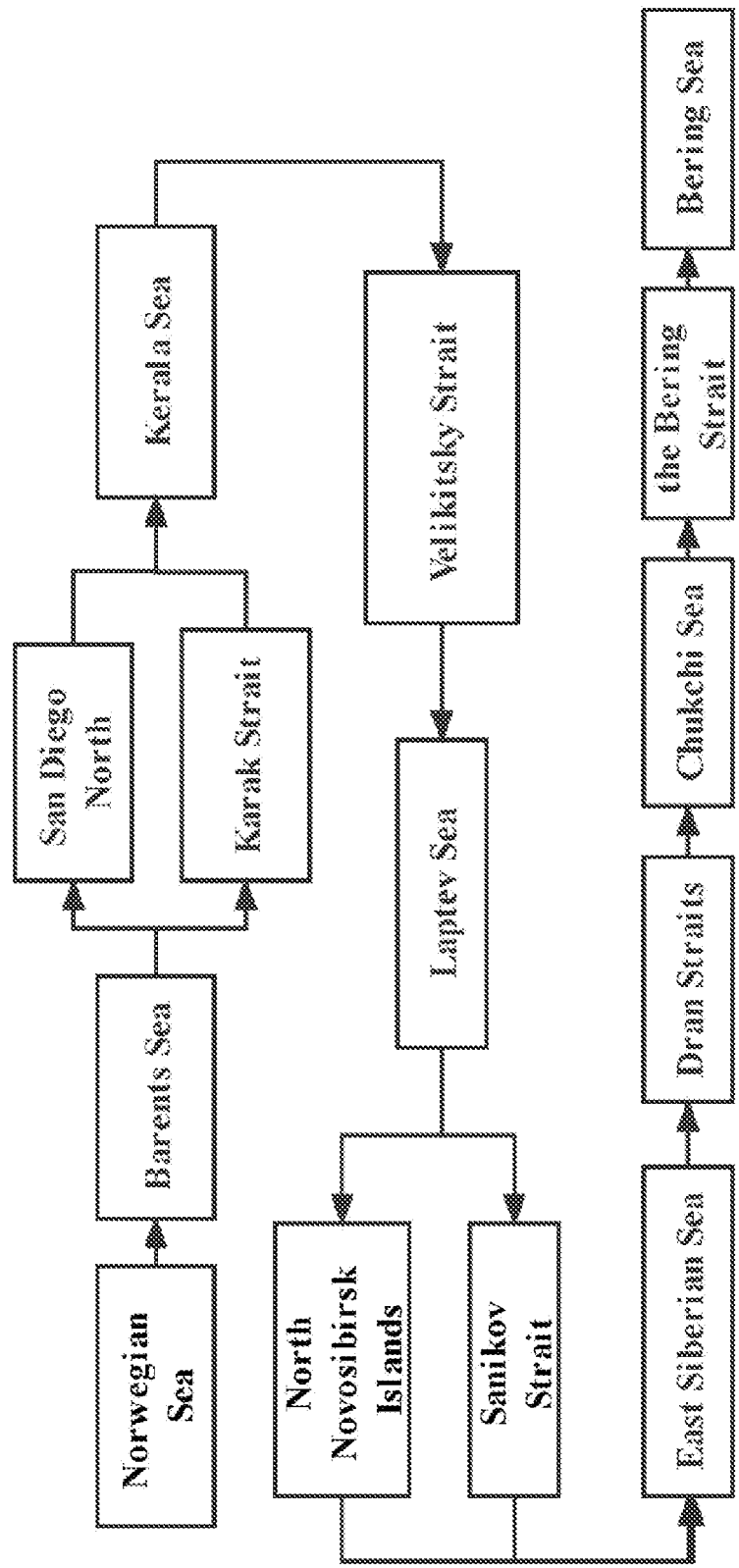
FIG. 3 shows a schematic diagram of sea areas and straits along the Arctic routes in the embodiment of the present application.

As shown in FIG. 3, sea areas and straits along the Arctic routes basically cover international transit routes of the Arctic Northeast route in recent years. Sample points on the routes (including the straits and sea areas) are selected to determine the coordinates of longitudes and latitudes ($LO_i$, $LA_i$), and navigation routes are labeled on planar or spherical map information files, so as to build up a correlation of the Arctic routes with Arctic sea areas and straits.

Figure 4:
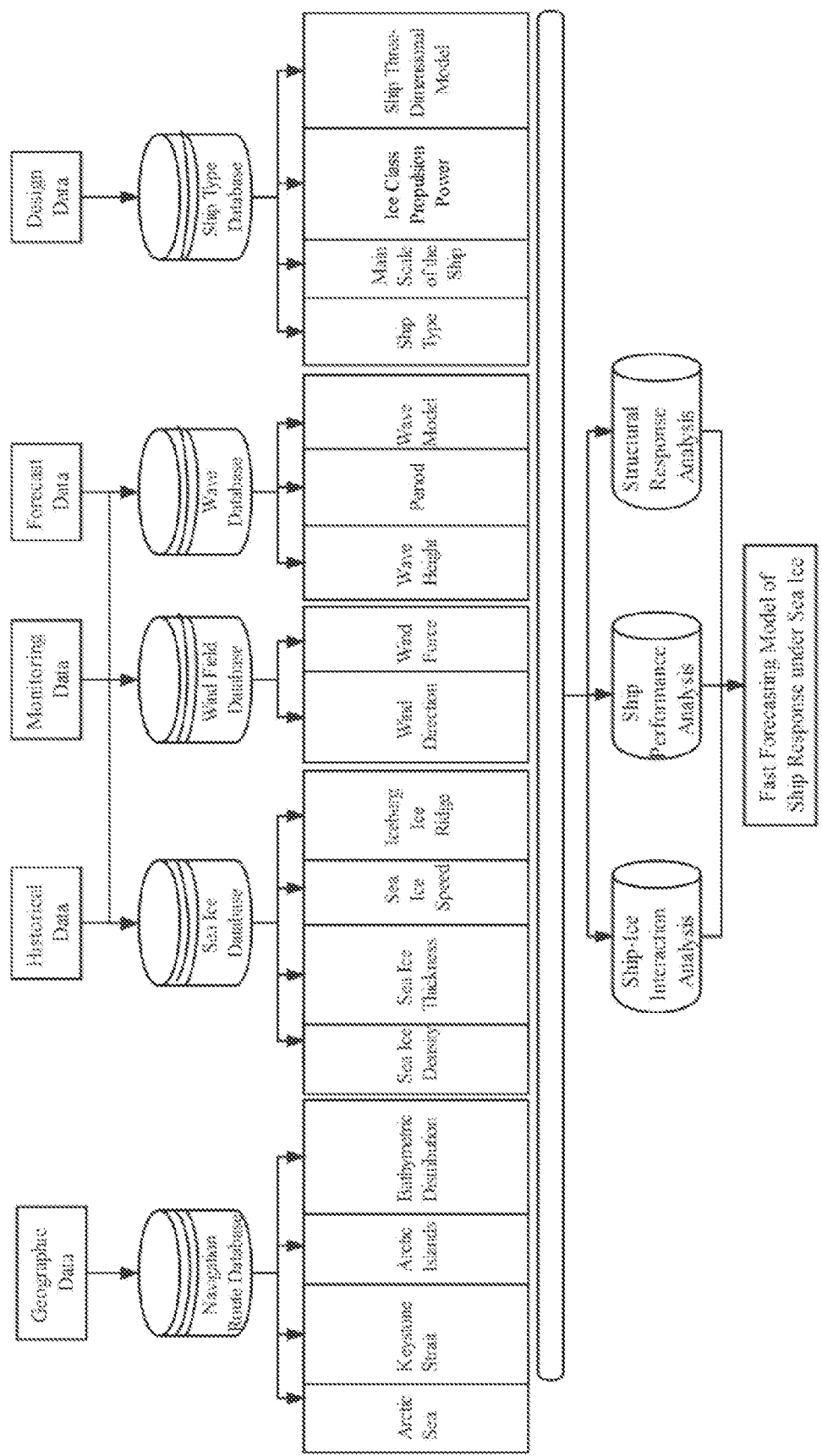
FIG. 4 shows a schematic diagram of the navigation route and ship type database in the embodiment of the present application.

The schematic diagram of the navigation route and ship type database is shown in FIG. 4. Based on map information files, a database of the Arctic Northeast route is established to realize the structured storage of information such as an Arctic sea area range, a key strait location, a bathymetric distribution, etc. using latitudes and longitudes as coordinates; based on domestic and international mainstream information sources, historical data, monitoring data and forecasting data of environmental information of sea ice, waves and wind field of the Arctic routes are sorted out, and classified by time, and based on variables of the latitudes and longitudes, the sea ice database including physical quantities such as sea ice densities, sea ice thicknesses, sea ice speeds, iceberg ice ridge shapes, etc. is established, the wind field database which includes physical quantities such as wind directions and wind forces is established, and the wave database which includes parameters such as wave heights, periods, and wave forecasting models of the relevant sea area is established; based on ship design information, the ship type database which includes information such as ship three-dimensional models, ship main scales, propulsive power, ice classes, and design speeds etc. is established. Based on a ship performance and safety analysis, calculation data and readable result model files of ship performance and structural response changes under different sea ice are formed, and a fast forecasting model of ship response under sea ice is established.

Figure 5:
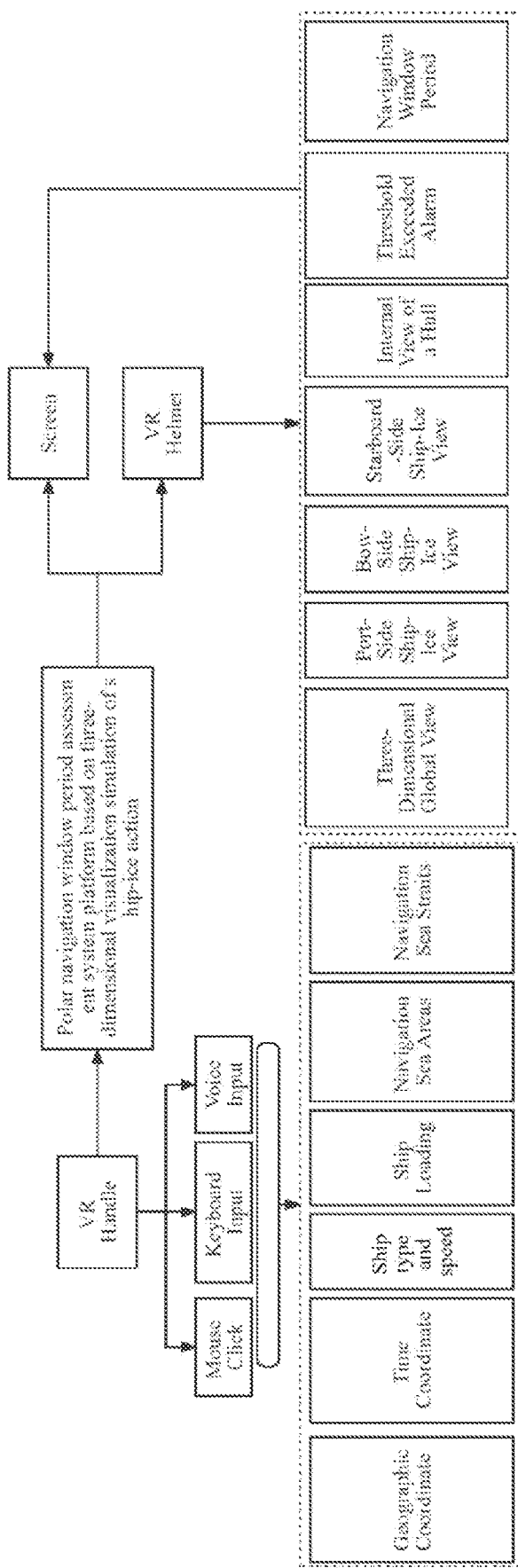
FIG. 5 shows a principle diagram of a virtual reality interactive operation in the embodiment of the present application.

The principle diagram of virtual reality interactive operation is shown in FIG. 5. Through the VR handle, the navigation scene is dynamically adjusted by simulating mouse click, keyboard input and voice input to change time nodes, spatial positions, navigation sea areas/straits, navigation speeds and other information of the ship on the Arctic routes; the computer screen or VR helmet is used for displaying the virtual scenes of the polar navigation, including information of a three-dimensional global view, a port-side ship-ice view, a starboard-side ship-ice view, a bow-side ship-ice view, an internal view of a hull, a threshold exceeded alarm and a navigation window period etc.

Figure 6:
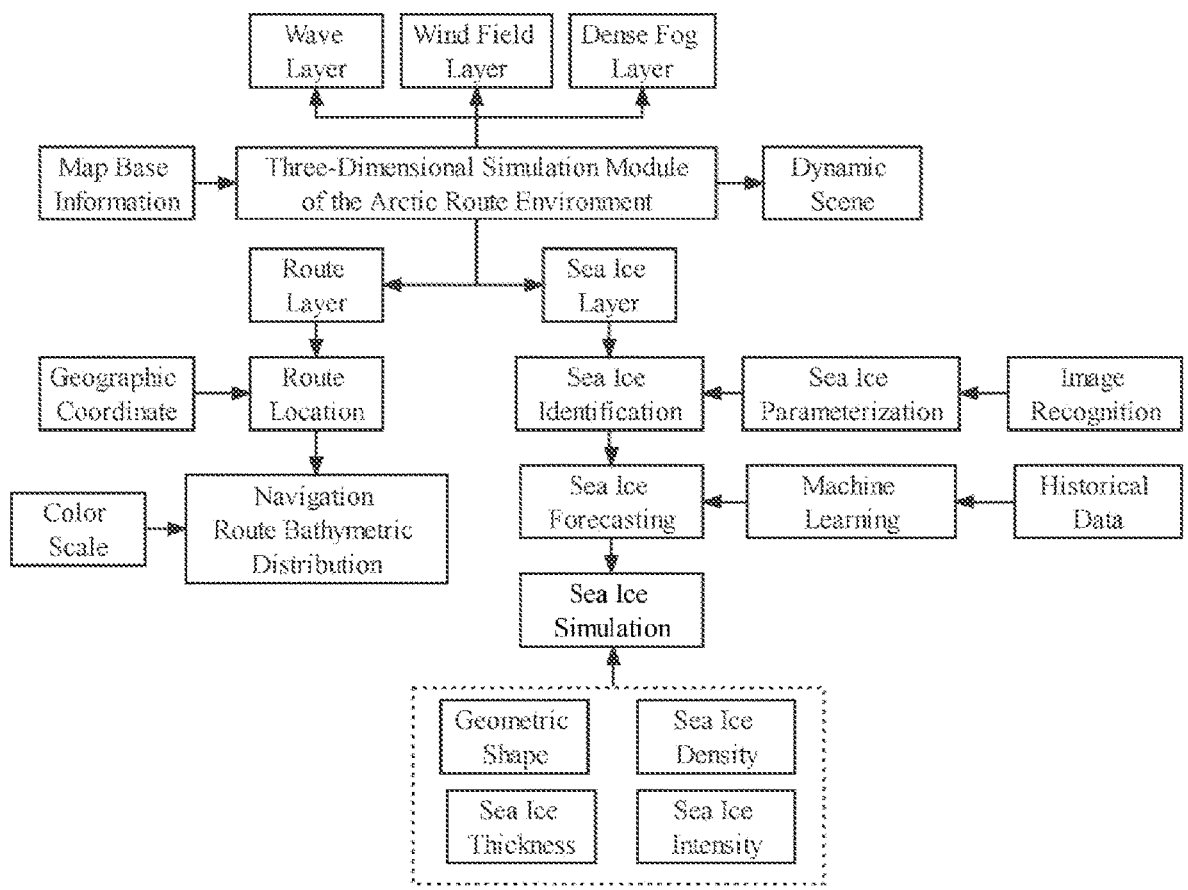
FIG. 6 shows a principle diagram of three-dimensional simulation of an Arctic route environment in the embodiment of the present application.

The principle diagram of three-dimensional simulation of the Arctic route environment is shown in FIG. 6. On the basis of map base data, a route layer, a sea ice layer, a wave layer, a wind field layer and a dense fog layer, etc. are set to simulate a route environment scene. According to a latitude and longitude range of the Arctic Northeast route, a navigation route bathymetric distribution map is set up, and different blue colors are used for indicating the changes of bathymetric scenes; time and space (latitudes and longitudes) are the main variables to simulate environmental changes of waves, sea ice, wind fields and dense fog, etc.; a wave environment layer realizes a three-dimensional simulation of a fluctuating effect by combining wave heights, wave periods and different waves; and a wind field environment layer indicates the information on wind speeds and wind directions to realize flags on the ship fluttering with wind; a fog environment layer increases a fog effect and expresses an effective sight distance of personnel on the ship through visibility indexes; a sea ice parameter recognition program automatically recognizes the shapes, distributions, densities and thicknesses of sea ice through input information of pictures and tables; combining with the machine learning, a short-term forecasting of the sea ice densities with spatial and temporal changes is completed; combining with information of the sea ice shapes, sea ice densities and ice thicknesses, a three-dimensional distribution scene of the sea ice is established, and a RGB legend characterization method of the sea ice densities display is provided.

Figure 7:
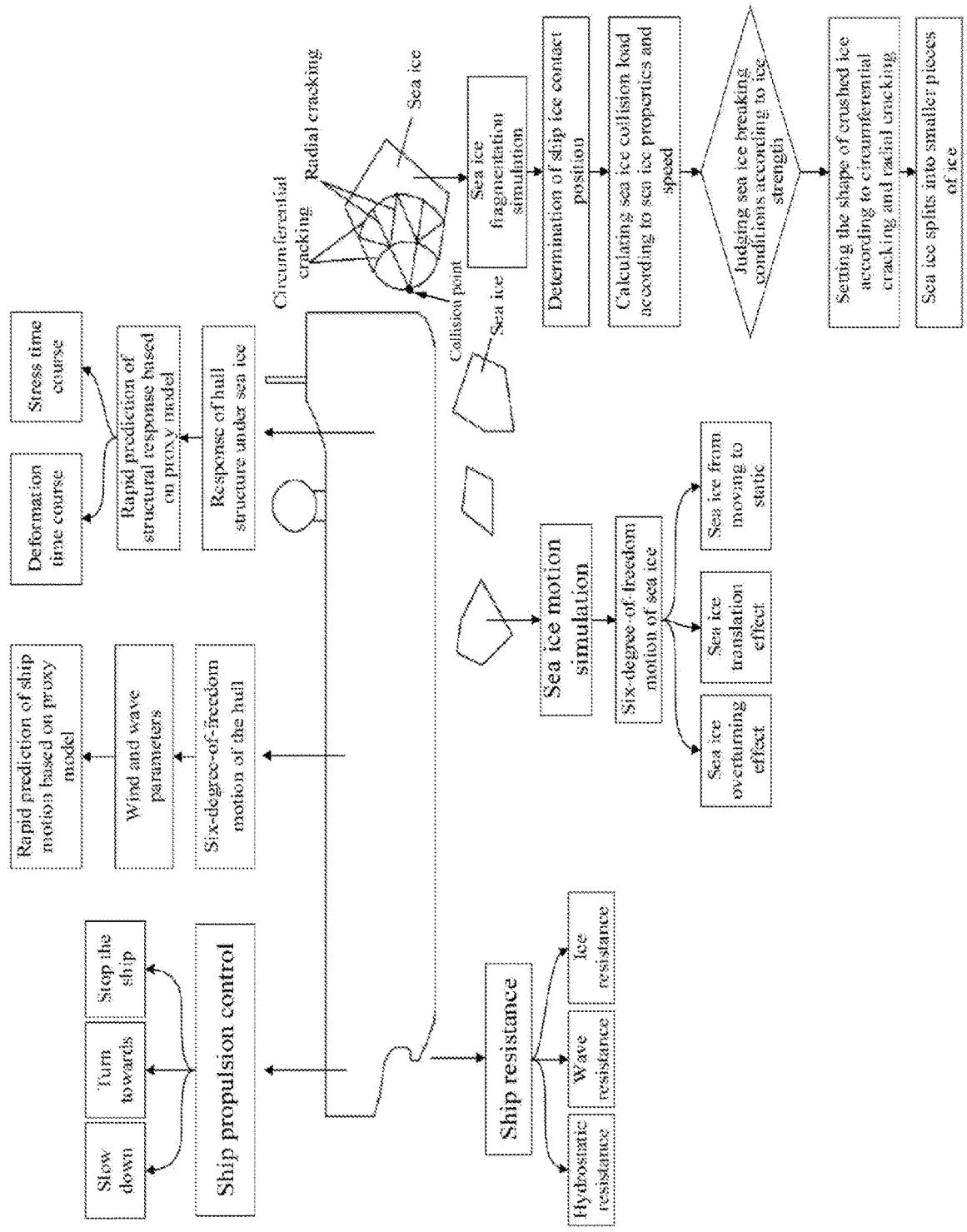
FIG. 7 shows a principle diagram of simulation of Arctic navigation virtual scene in the embodiment of the present application.

The principle diagram of the simulation of Arctic navigation virtual scene is shown in FIG. 7. A contact point between a hull shell and sea ice is judged, a sea-ice collision load by combining a relative speed of a ship to ice is calculated, a sea ice breaking shape based on ice strength indexes is generated, and 3 to 5 pieces of broken ice is randomly generated through circumferential cracks and radial cracks; physical attributes of the sea ice such as the density and volume of sea ice are set, and a motion equation of the broken ice in water under a ship-ice collision is established, so as to realize a process of floating, flipping, and standing still of the sea ice in water; combining with a ship simulation software, ship resistance and structural response under sea ice are analyzed, and an agent model for rapid forecasting of ship performance under different sea ice densities is established; motion response of the ship in ice-water mixtures under a variety of loads, such as waves, sea ice, and ship weights is assessed, and a model for rapid forecasting of six-degree-of-freedom motion of the hull is established; and software plug-ins are developed by adopting a virtual reality software, and a ship-ice collision interaction and a sea ice breaking process, a ship resistance and structural response under sea ice, and a virtual scene of the six-degree-of-freedom motion of the hull under sea ice are established.

Figure 8:
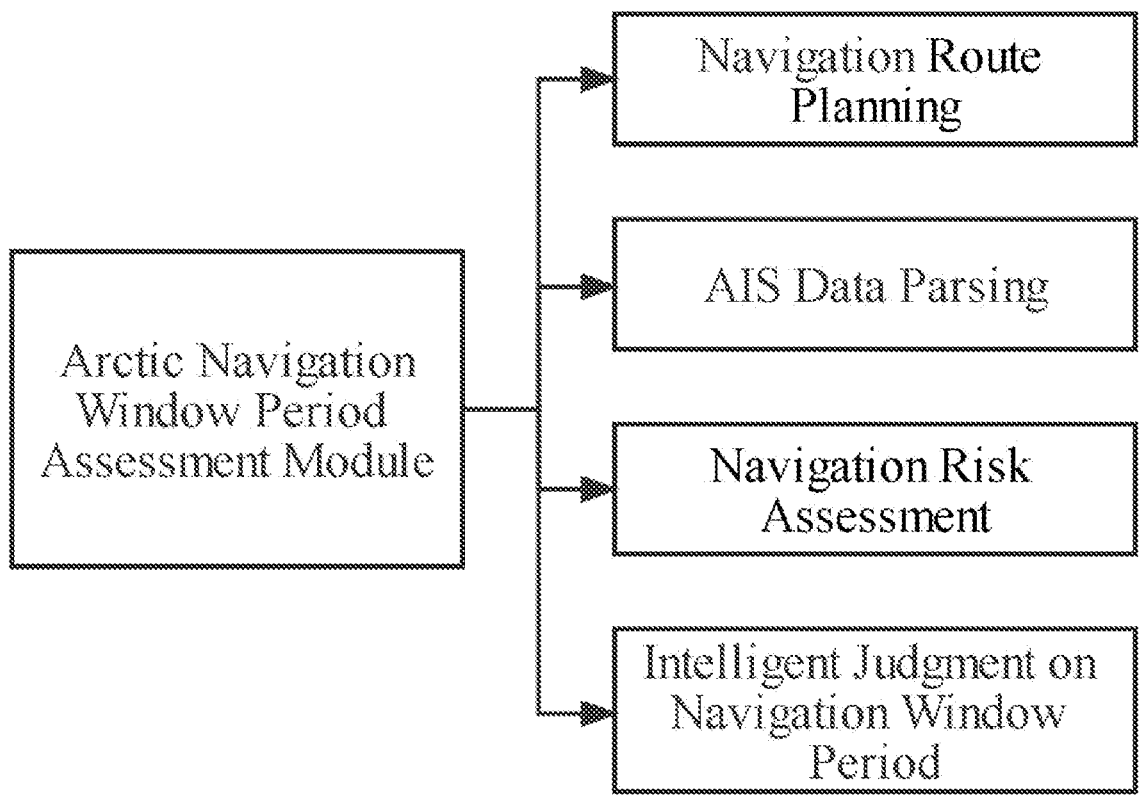
FIG. 8 shows a principle diagram of an Arctic navigation window period assessment in the embodiment of the present application.

The schematic diagram of the Arctic navigation window period assessment is shown in FIG. 8. According to straits along the Arctic Northeast route, different plans for the Arctic routes are established; combined with the ship AIS data, the longitude, latitude, speed, heading, type, MMSI, ice class, propulsion power and other information of the ship are clarified; an expression of sea ice risk affecting the safe navigation in the polar region is established, and sea ice densities, sea ice thicknesses, ship ice-resistance, ship propulsion power and other factors are used as the indexes to assess a comprehensive navigation risk in a given ice area; combining sea ice distribution information with sea ice forecasting information, the navigation window period of a given ship type in different routes is assessed, and a window period intelligent judgment program is developed based on a machine learning algorithm.

$$RIO_V = \Sigma C_T \times RS_{V,T} + \Sigma C_T \times RP_{V,T}$$

In the formula, $C_T$ is a T type ice condition in a region, $RS_{V,T}$ is a structural anti-ice risk level of a V type ship navigating in a T type sea ice area, and $RP_{V,T}$ is a structural propulsion risk level of the V type ship navigating in the T type sea ice area.

Further, the system storing and outputting module adopts a standard data approach to automatically save model file information in a corresponding folder that exists in a time sequence, facilitating the subsequent direct invocation of the virtual scenes; all interactive interaction operations are saved in a specific file, and a script file approach is used for recording information such as operation time, operation commands, feedback results, etc.; results of the identification, forecasting, and assessment of this system platform provide output results in form of curve diagrams and data tables.

This embodiment effectively integrates sea ice remote sensing information and measured data to improve accuracy of sea ice identification; utilizes machine learning methods and historical data to achieve short-term forecasting of sea ice changes, providing data for safe navigation of ships in polar region; develops the simulation program for sea ice morphology and ship-ice interaction processes, which realistically presents a three-dimensional effect of sea ice fragmentation under a collision interaction; researches and develops the polar navigation window period assessment program, which improves the ability of intelligent judgment of the Arctic routes passage; and sets up virtual reality scenes to facilitate users to experience a process of navigation in polar ice area in an immersive manner.

The working principle of this assessment system platform is simple, the devices arrangement is easy, the scenes are real and effective, and the application scenes are diversified, which is convenient to carry out the polar navigation safety assessment and simulation training, and solve the problem of a lack of a virtual reality platform for polar navigation safety analysis.

The above mentioned is only a relatively good specific implementation of the present application, but the scope of protection of the present application is not limited thereto, and any changes or substitutions that can be readily thought of by any person skilled in the art within the scope of the technology disclosed in the present application should be covered by the scope of protection of the present application. Therefore, the scope of protection of this application should be based on the scope of protection of the claims.

What is claimed is:

1. A polar navigation window period assessment system based on three-dimensional visualization simulation of ship-ice interaction, comprising a virtual reality interactive operation module, a three-dimensional virtual visualization integration module, a three-dimensional simulation module of an Arctic route environment, an Arctic navigation virtual scene module, an Arctic navigation window period assessment module and a system storing and outputting module connected in sequence;
   wherein the virtual reality interactive operation module is used for interacting with virtual reality scenes based on a VR handle and a VR helmet, and the virtual reality scenes comprise an internal view of a hull, a route environment scene and a navigation virtual scene;
   the three-dimensional virtual visualization integration module is used for observing the virtual reality scenes using a global perspective;
   the three-dimensional simulation module of the Arctic route environment is used for setting a route layer, a sea ice layer, a wave layer, a wind field layer and a dense fog layer to simulate the route environment scene;
   the Arctic navigation virtual scene module is used for establishing the navigation virtual scene of a sea ice breaking process, a ship-ice collision interaction, ship resistance and structural response under sea ice, and a six-degree-of-freedom motion of the hull under the sea ice;

the Arctic navigation window period assessment module is used for assessing navigation window periods of a ship on different routes based on sea ice distribution information and sea ice forecasting information;

the system storing and outputting module is used for storing interactive operation information, virtual reality scene information and window period assessment result information, and outputting in forms of curve diagrams and data tables; and the Arctic navigation window period assessment module is used for planning navigation routes of the ship and parsing AIS data of the ship to obtain longitude, latitude, speed, heading, ship type, MMSI, ice class and propulsion power information of the ship; assessing a comprehensive navigation risk in an ice area based on a sea ice density, a sea ice thickness, ship ice-resistance and ship propulsion power; and assessing the navigation window periods of the ship on the different routes based on sea ice distribution and sea ice forecasting information, and making an intelligent judgment on the navigation window periods based on machine learning;

wherein a formula for assessing the comprehensive navigation risk in the ice area is shown below:

$$RIO_V = \Sigma C_T \times RS_{V,T} + \Sigma C_T \times RP_{V,T}$$

wherein $C_T$ is a T type ice condition in a region, $RS_{V,T}$ is a structural anti-ice risk level of a V type ship navigating in a T type sea ice area, and $RP_{V,T}$ is a structural propulsion risk level of the V type ship navigating in the T type sea ice area.

2. The polar navigation window period assessment system based on three-dimensional visualization simulation of ship-ice interaction according to claim 1, wherein the polar navigation window period assessment system further comprises a database module, and the database module is used for establishing a navigation route database based on Arctic geographic information; establishing a sea ice database, a wave database and a wind field database based on airborne remote sensing, on-board monitoring and sea/land monitoring measures; establishing a ship type database based on ship design information; and establishing a database of ship performance and structural response changes under different sea-ice interactions based on ship performance and safety analysis.

3. The polar navigation window period assessment system based on three-dimensional visualization simulation of ship-ice interaction according to claim 1, wherein the virtual reality interactive operation module is used for changing time nodes and spatial positions of the ship in an Arctic route through the VR handle, realizing a real-time dynamic adjustment of a navigation scene, and displaying the navigation virtual scene of a polar ship through the VR helmet; and the navigation virtual scene comprises a three-dimensional global view, a port-side ship-ice view, a starboard-side ship-ice view, a bow-side ship-ice view, an internal view of the hull, a threshold exceeded alarm and a navigation window period.

4. The polar navigation window period assessment system based on three-dimensional visualization simulation of ship-ice interaction according to claim 2, wherein the three-dimensional simulation module of the Arctic route environment is used for setting up the route layer, the sea ice layer, the wave layer, the wind field layer and the dense fog layer to simulate the route environment scene by retrieving corresponding data in the database module, obtaining sea ice shape information, sea ice distribution information, sea ice density information, and ice thickness information, and establishing a three-dimensional distribution scene of the sea ice.

5. The polar navigation window period assessment system based on three-dimensional visualization simulation of ship-ice interaction according to claim 4, wherein the route layer is used for establishing a navigation route bathymetric distribution map according to a latitude and longitude range of Arctic Northeast route; the sea ice layer is used for simulating environmental changes of waves, sea ice, wind fields and dense fog according to the changes in time and space; the wave layer is used for simulating fluctuating effects by combining wave heights and wave periods; the wind field layer is used for making flags on ships flutter with wind by indicating information of wind speeds and wind directions; and the dense fog layer is used for increasing dense fog and obtaining an effective sight distance of personnel on the ship through visibility indexes.

6. The polar navigation window period assessment system based on three-dimensional visualization simulation of ship-ice interaction according to claim 2, wherein the Arctic navigation virtual scene module is used for calling the corresponding data in the database module, and obtaining a sea-ice collision load based on a contact point between a hull shell and the sea ice and in conjunction with a relative speed of a ship to ice, generating a sea ice breaking shape based on the sea-ice collision load and ice strength indexes, generating a plurality of pieces of broken ice randomly through circumferential cracking and radial cracking, and thus establishing the sea ice breaking process; establishing the ship-ice collision interaction based on physical attributes of the sea ice; analyzing ship resistance and structural response under sea ice based on a ship simulation model; assessing motion response of the ship in ice-water mixtures, and establishing the navigation virtual scene of the six-degree-of-freedom motion of the hull under sea ice based on a wave load, a sea ice load, and a ship weight load.

* * * * *